L. S. CLARK.
Thill Coupling.

No. 99,535.

Patented Feb. 8, 1870.

Witnesses.
A. Bunneraendorf
Jno. K. Brooks

Inventor
L. S. Clark
per Mumm
Attorneys.

United States Patent Office.

L. S. CLARK, OF BETHEL, CONNECTICUT, ASSIGNOR TO HIMSELF, G. S. PECK, AND G. W. LYON.

Letters Patent No. 99,535, dated February 8, 1870.

---

IMPROVEMENT IN SHIFTING CUTTER-THILLS.

---

The Schedule referred to in these Letters Patent and making part of the same

---

*To all whom it may concern:*

Be it known that I, L. S. CLARK, of Bethel, in the county of Fairfield, and State of Connecticut, have invented a new and useful Improvement in Adjustable Draught-Bars; and I do hereby declare that the following is a full, clear, and exact description thereof, which will enable others skilled in the art to make and use the same, reference being had to the accompanying drawings, forming part of this specification.

The object of this invention is improvement in adjustable draught-bars, or devices for shifting the thills of one-horse vehicles, so that the horse may travel either in the middle or at one side of the road-track, as circumstances may require; and The invention consists in the combination and arrangement of parts, as hereinafter specified.

In the accompanying drawing—

Similar letters of reference indicate corresponding parts.

A represents the runners of the vehicle or cutter.

Figure 1:
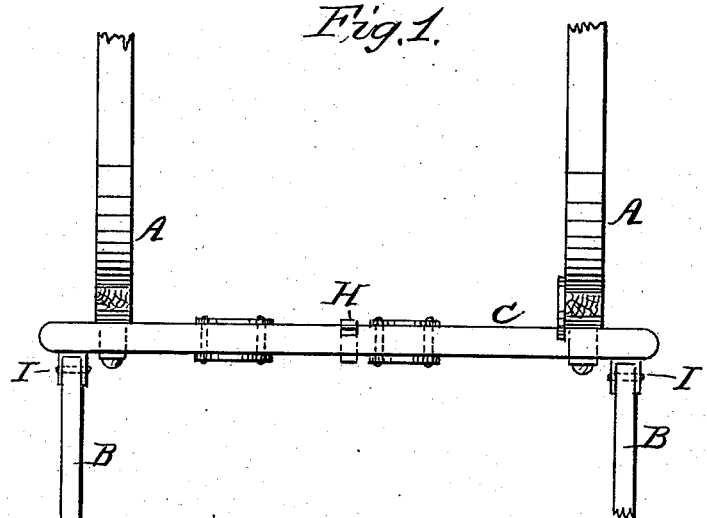
Figure 1 represents a top view of the draught-bar, connected with the runners of a cutter or one-horse sleigh, and with the thills attached.

B, fig. 1, represents the thills.

C is the adjustable draught-bar.

D is a bar, affixed to the runners by means of bolts or clasps, or in any substantial manner.

E represents clasps, the upper ends of which extend above the bar, and serve to guide and keep the adjustable bar in place, as well as to take the main pull or force of the draught, as seen at F.

Figure 2:
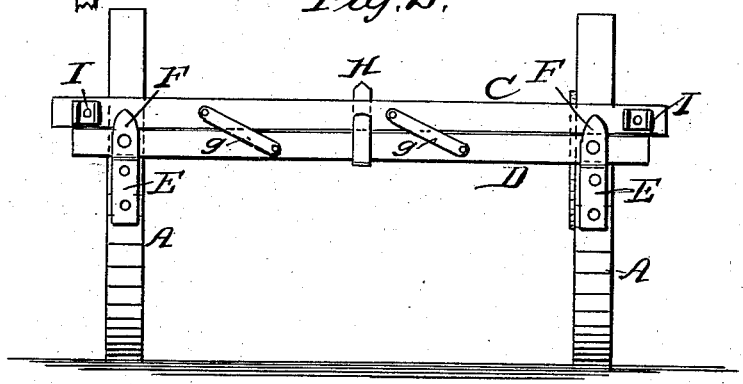
Figure 2 is a front view of the bar, as connected with the front or upright portion of the runners shown, the draught-bar arranged to have the horse travel in the middle of the road-track.
Figure 3:
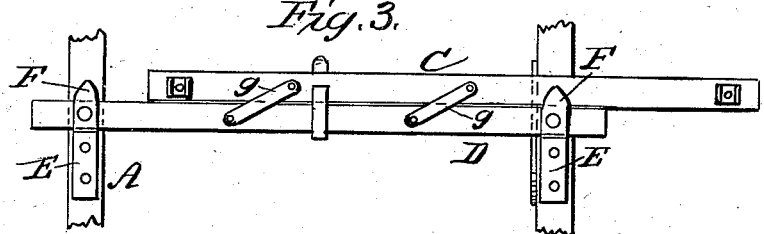
Figure 3 is a view of the same, with the draught-bar arranged for the horse to travel on one side, as is common on country roads in sleighing-time, and frequently at other times.

The adjustable bar C is connected with the stationary or fixed bar D, by two, more or less, joint-straps or links $g$ $g$, by which means the draught-bar C is thrown into either of the two positions seen in figs. 2 and 3.

H represents a spring hook, which is attached to the fixed bar D, to hold the draught-bar in contact with D, as seen in the drawing. Two or more of these hooks may be used, or any other suitable means may be employed for this purpose.

I represents thill-fastenings on the draught-bar.

By this arrangement, the thills of the cutter or other vehicles may be changed from the side to the central draught, and *vice versa*, without delay.

Having thus described my invention,

I claim as new, and desire to secure by Letters Patent—

1. The combination of the links $g$ $g$, hooks H, movable bar C, fixed bar D, clasps E, and fastenings I, with the runners A and thills B, all arranged as and for the purpose specified.

2. The combination of the bars D and C with the runners of a one-horse sleigh or other one-horse vehicle, arranged and operating substantially as and for the purposes described.

The above specification of my invention, signed by me, this 9th day of December, 1869.

L. S. CLARK.

Witnesses:
GEO. W. MABEE,
ALEX. F. ROBERTS.